United States Patent
Chou et al.

(10) Patent No.: US 7,675,904 B2
(45) Date of Patent: Mar. 9, 2010

(54) VOIP TERMINAL CAPABLE OF HAVING CONVERSATION THROUGH BOTH INTERNET AND PSTN

(75) Inventors: Hong Chou, Taipei (TW); Min-Chieh Wu, Taipei (TW); Yu-Min Shen, Taipei (TW); Hsiao-Wen Tin, Taipei (TW); Chia-Hsuan Wu, Taipei (TW); Yoke Yau Kok, Penang (MY)

(73) Assignee: Inventec Multimedia & Telecom Corporation, Taipei (TW)

( * ) Notice: Subject to any disclaimer, the term of this patent is extended or adjusted under 35 U.S.C. 154(b) by 1283 days.

(21) Appl. No.: 11/043,921

(22) Filed: Jan. 28, 2005

(65) Prior Publication Data

US 2006/0187898 A1      Aug. 24, 2006

(51) Int. Cl.
*H04M 7/00*       (2006.01)
*H04L 12/66*      (2006.01)

(52) U.S. Cl. .................. 370/352; 370/354; 370/356; 379/219; 379/220.01; 379/221.01

(58) Field of Classification Search ................ 370/352, 370/356, 354; 379/221.01, 219, 221.08, 379/220.01; 709/227
See application file for complete search history.

(56) References Cited

U.S. PATENT DOCUMENTS

| | | | |
|---|---|---|---|
| 2002/0196777 A1* | 12/2002 | Wu et al. ............... | 370/352 |
| 2004/0218748 A1* | 11/2004 | Fisher ................... | 379/221.01 |
| 2004/0267936 A1* | 12/2004 | Sagiv .................... | 709/227 |
| 2005/0152347 A1* | 7/2005 | Chen et al. ............ | 370/356 |

* cited by examiner

*Primary Examiner*—Thjuan K Addy
(74) *Attorney, Agent, or Firm*—Stout, Uxa, Buyan & Mullins, LLP

(57) ABSTRACT

A VoIP terminal, which supports to make a phone call through both PSTN and Internet is disclosed. A local subscriber may choose to have a conversation through PSTN or Internet on his own. Besides, by reference to a switch such as a relay, the VoIP terminal is able to establish a PSTN connection under some special cases, such as the terminal power off or Internet shutdown.

11 Claims, 7 Drawing Sheets

VOIP TERMINAL CAPABLE OF HAVING CONVERSATION THROUGH BOTH INTERNET AND PSTN

BACKGROUND OF THE INVENTION

1. Field of the Invention

The present invention relates to a VoIP terminal which, specially relates to a Public Switch Telephony Network (PSTN) connectable VoIP terminal.

2. Description of the Prior Art

With the progress of the Voice over IP (VoIP) technology, more and more Internet voice service applications are developed. FIG. 1A and FIG. 1B illustrate two conventional Internet voice service systems. Referring to FIG. 1A, both sides of the conversation are communicated through the Internet, in which the most common is the conversation between two computers. For example, the computer could transform voice signals into network packets and transmit to another side of the conversation according to telephone software and microphone device. FIG. 1B illustrates the system architecture for wideband phone that a common city telephone connects to the Internet and transmits voice data to foreign subscribers through the Internet instead of the original PSTN. The terminal apparatus of the subscriber A (i.e., wideband phone) includes a modem, which dials on ISP through PSTN first for connecting to the Internet, and then connects to subscriber B or C. In the example, the terminal apparatus of subscriber B is a computer and terminal apparatus of subscriber C is a common city telephone.

With a comparison to the voice services based on a circuit switch network (i.e., PSTN), the fee for Internet conversation is much cheaper and very attractive for business.

The conventional PSTN phone system is a common battery system; it is unnecessary of providing additional power to the terminal apparatus (phone set), except that from telecommunication central office. On the other hand, it is essential to provide power to the terminal apparatus for the Internet voice service. Therefore, the subscriber cannot make a phone call if local subscriber encounters a power off condition. Besides, every established connection of the circuit switch network is monopolistic. Both sides of conversation share and occupy a unique telephone line during conversation as well as a private line except when the connection is unable to establish. As to the Internet connection, different users or applications may share any link section of connection simultaneously. Hence, if a link section is congested, two sides of conversation will receive delayed voices. Furthermore, a circuit switch network such as PSTN is more widely laid. These advantages mentioned make the conventional telephone remain its value and market.

Hence, when a subscriber has the communication environment for connecting to both Internet and PSTN at the same time, it would be better to have a terminal apparatus capable of establishing conversation through Internet and PSTN.

SUMMARY OF THE INVENTION

According to the foregoing descriptions, an objective of the invention is to provide a PSTN communicable VoIP terminal, which could have conversations through both PSTN and Internet. According to the present VoIP terminal, the subscriber may choose to have a conversation through the Internet or PSTN on his own.

Furthermore, another objective of the invention is to provide a VoIP terminal, which may automatically establish a conversation through the PSTN instead of the VoIP for different situations such as the local subscriber has a power off condition or Internet shutdown.

The invention provides a VoIP terminal which has the foregoing capabilities, the VoIP terminal includes: a CPU for controlling the operations of the other modules mentioned below; an Internet communication module for transforming voice signal into network packet and vice versa; a data process module for analog/digital voice signal transformation; a memory module for temporarily storing data; a switch unit for; and a set of communication ports having at least three communication ports, which provides the local subscriber to communicate with a foreign subscriber through the PSTN or Internet.

DESCRIPTION OF THE PREFERRED EMBODIMENT

Some embodiments of the present invention will be described in detail in the following. However, beside the detailed description, the present invention can also be applied widely in other embodiments and the scope of the present invention is only limited by the appended claims.

Figure 1A:
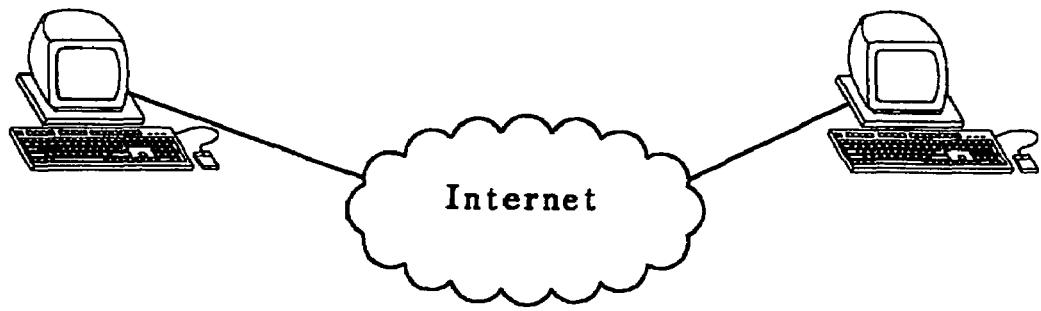
FIG. 1A illustrates the conventional phone service based on Internet.
Figure 1B:
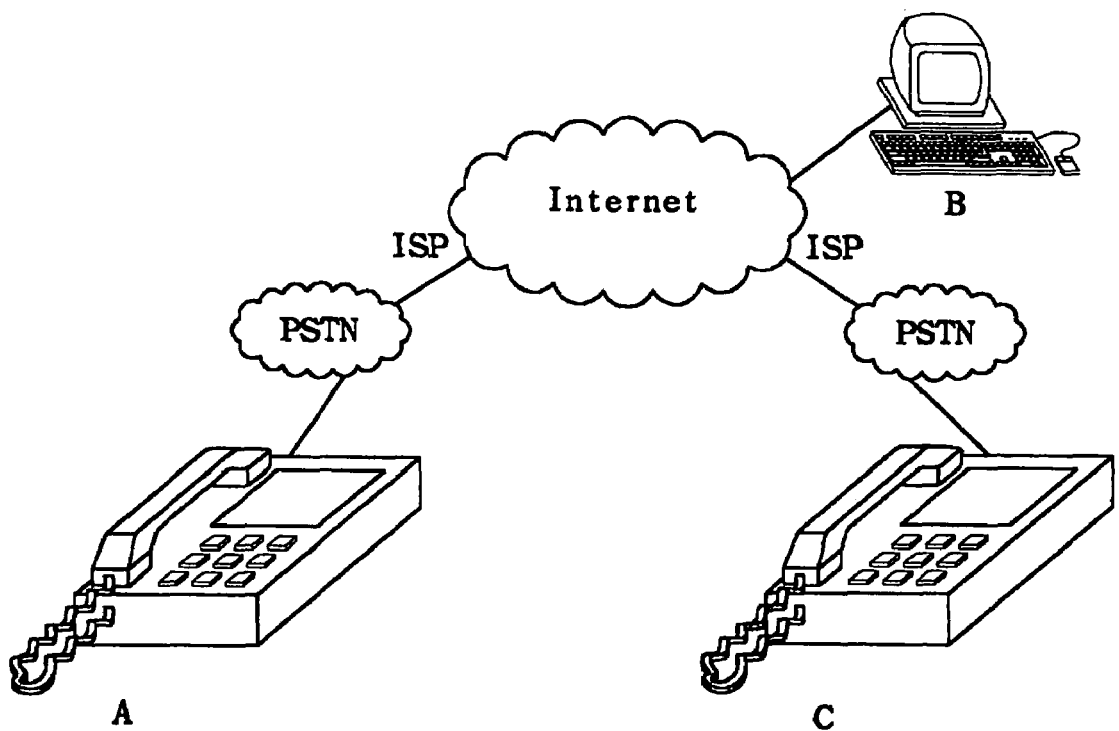
FIG. 1B illustrates the system architecture for the conventional Internet wideband phone.
Figure 2:
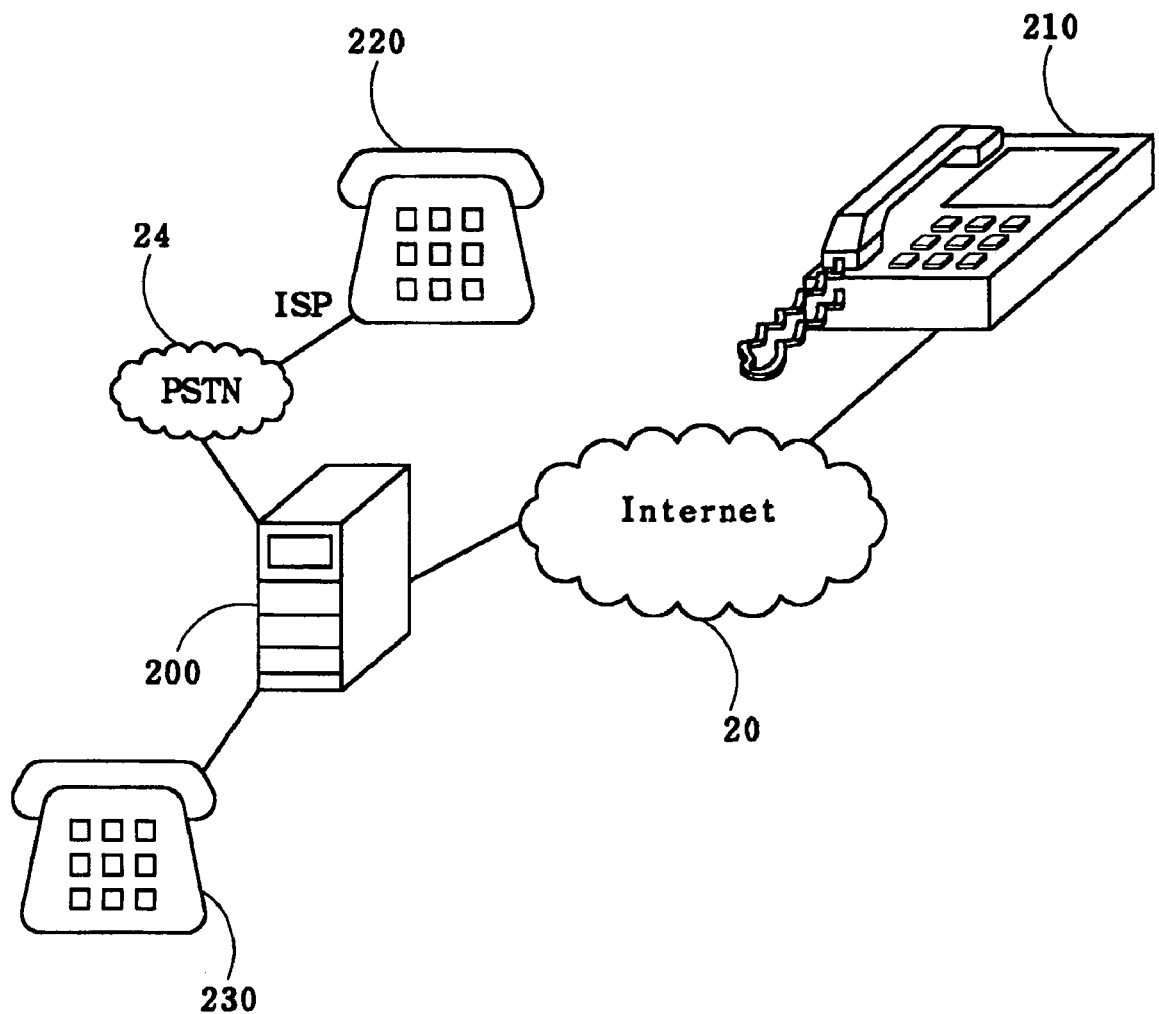
FIG. 2 illustrates the communication system applied with the present VoIP terminal.

FIG. 2 illustrates the communication system with the present VoIP terminal of the invention. VoIP terminal 200 is able to connect to Internet 20 or PSTN 24, which may dial to a phone set 210 located in Internet 20 or another phone set 220 located in PSTN 24. It's noticed that, for a clear description, the mobile phone system is ignored throughout the patent instruction. Because a mobile phone communicates with a subscriber of PSTN or another mobile phone through a mobile network (i.e., GSM network), hence it might be treated as belonging to a special case of phone set 220. In addition, the VoIP terminal 200 could further connect to the phone set 230 for voice input/output, or install a microphone and a speaker on itself for voice input/output directly.

Figure 3:
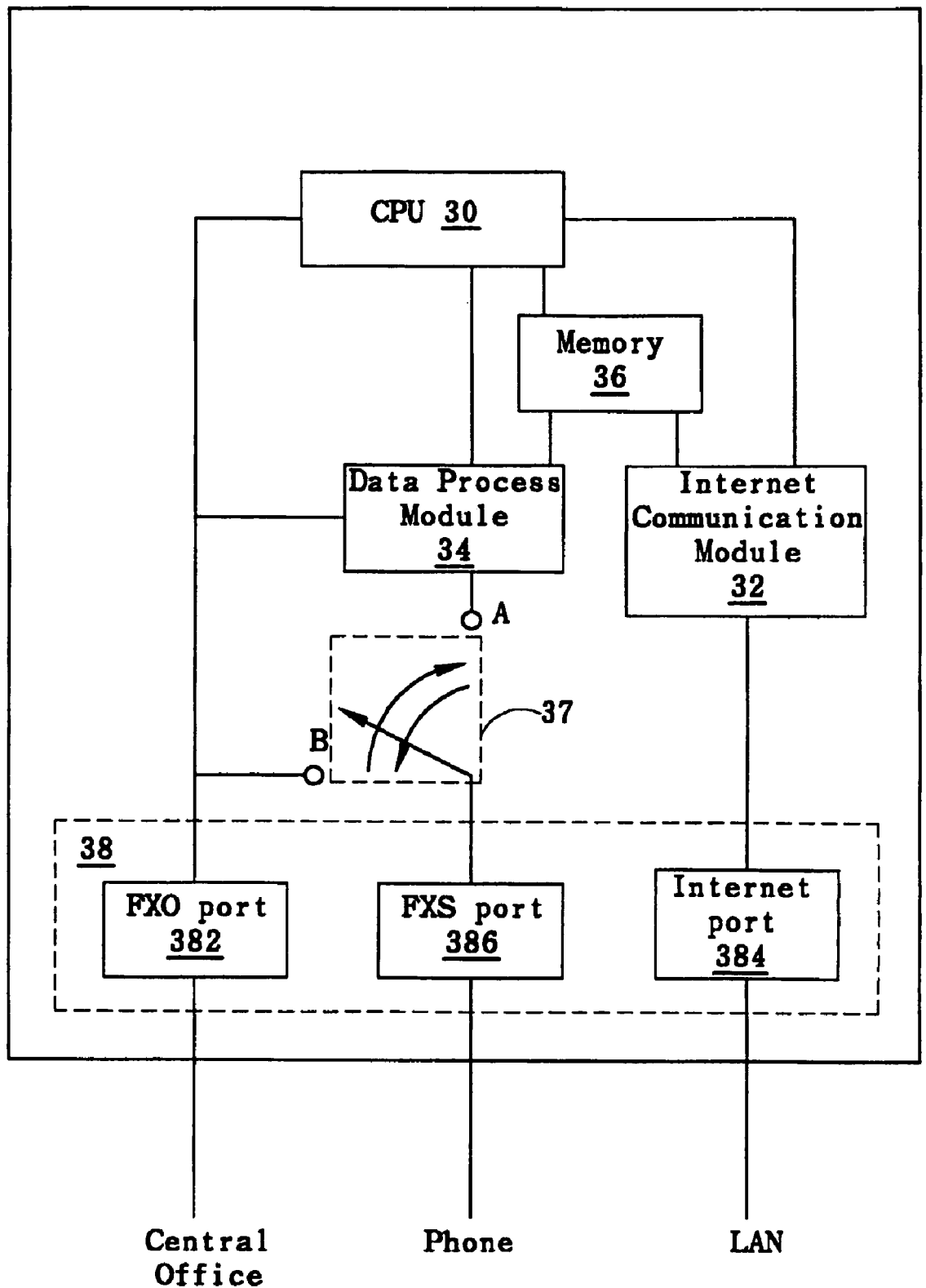
FIG. 3 illustrates the preferred embodiment of the invention.

FIG. 3 illustrates the system diagram for the present VoIP terminal of the invention, which includes: a CPU 30, an Internet communication module 32, a data process module 34, a memory module 36, a switch unit 37, and a set of communication ports 38. Among them the memory module 36 is used for storing temporary data and the phone numbers, which could be implemented with FLASHRAM, SRAM, or other memory devices. The other components of the present VoIP terminal will be described beneath.

The present VoIP terminal connects to different telecommunication networks and apparatus through the set of communication ports 38. The set of communication ports 38 includes: a FXO (Foreign Exchange Office) port 382 for connecting to a central office of PSTN; an Internet port 384 for connecting to the local area network (LAN); and a FXS (Foreign Exchange Subscriber) port 386 for connecting to a local phone set (usually a city phone set).

In general cases, the present VoIP terminal is set to dial through the Internet in default. In other words, it's a priority to have the low-cost VoIP conversation than the PSTN conversation, and calls as VoIP mode. In contrast, the condition that the VoIP terminal is set to dial through PSTN in default is called the PSTN mode. VoIP terminal stands by with different modes for different situations, which will be described in detail later.

CPU 30 connects with the Internet communication module 32, the data process module 34, and the FXO port 382, which controls the operations of each module and manages the Internet/PSTN conversations as well as the CPU of a computer. When the terminal is going to dial a foreign subscriber, CPU 30 determines the establishing Internet or PSTN conversation according to different phone numbers and situations (described in after). When receiving an incoming call, no matter if the PSTN incoming call is from a FXO port 382 or the VoIP incoming call is from Internet port 384, it will be input into the CPU 30 which determines if accepting the call is needed and controls the VoIP terminal establish a VoIP or PSTN conversation. As shown in the drawing, the CPU 30 connects to the FXO port 382 directly for receiving the PSTN incoming call. After the conversation established, the voice data is transmitted through the data process module 32, FXO port 382 and FXS port 386. Besides, it further controls the operation of the switch unit 37, which will be illustrated later.

Data process module 34 comprises at least the subscriber line integrated circuit (SLIC), data access arrangement (DAA), and the coding/decoding circuit (CODEC) . . . etc. (not shown in the drawing), which manages the analog/digital voice conversion and forms the PSTN phone signals. In other words, data process module 34 converts the input analog voice signals form FXS port 386 into the digital voice signals, or converts the digital voice signals into analog voice signal reversely to form the PSTN phone signals. Except for the foregoing functions, the data process module 34 may further comprise the encryption/decryption circuits, which provides the communication security to the VoIP conversation. Furthermore, the other functions, like signal amplifying or de-noise process, may be installed optionally in the data process module 34.

Internet communication module 32 connects with the network port 384 and CPU 30. When the VoIP terminal determines to dial through Internet, except converting the analog voice into the digital voice, it's essential to transform the digital voice into the network packets before transmitting through the Internet. Besides, the network packets from the network port 384 should transform into digital voice signals firstly, and then output to the local phone set after data process module 34 converts the digital voice into analog voice. Therefore, Internet communication module 34 is functional of the network card of the computer. Generally speaking, the data process module 34 supports the most popular network environment—Ethernet LAN, and it may expand to support other network environments (i.e., Token Ring), which is not limited in the invention.

One characteristics of the invention is, in addition to the user may choose to dial a VoIP or a PSTN phone on his own, the present VoIP terminal further has the capability of establishing an Internet or PSTN connection for different situations by reference to a switch. As shown in the drawing, the switch unit 37 connects to a position A originally for dialing through the Internet. When the user decides to dial PSTN phone, or a special condition occurs, such as power off or Internet shutdown, switch unit 37 switch to position B automatically. Switch unit 37 may be a passive switch device, such as a relay, which connects the FXS port 386 to data process module 34 originally for communicating the local phone set with a foreign subscriber. Switch unit 37 may switch to position B automatically for connecting the FXS port 386 with the FXO port 382 when foregoing special conditions occur, or establish a PSTN connection as receiving the control signal of CPU 30.

It's noticed that, switch unit 37 connects to position A as having a normal power supply, therefore the signal flow for a normal PSTN conversation is: the phone of FXO port 382 inputs into data process module 34 through FXO port 382, and further connects to the local phone set behind the FXS port 386. Similarly, an outgoing phone tracks the identical but reverse signal path—from FXS port 382, data process module 34, and FXO port 382—to a foreign subscriber. However, the PSTN conversation under power off condition is a little different. Under the power off condition, the switch unit 37 connects to position B, which makes the signal flow of the PSTN conversation change to the following path from the FXS port 382 to FXS port 386 directly without the participation of a data process module 34. Of course, it's practicable that the switch unit 37 switches to position B each time as having a PSTN conversation. As long as the later example, the switch unit 37 must be an active switch capable of operating in accordance to the control signal of the CPU 30, hence it's more complicated than a simple relay.

Figure 4A:
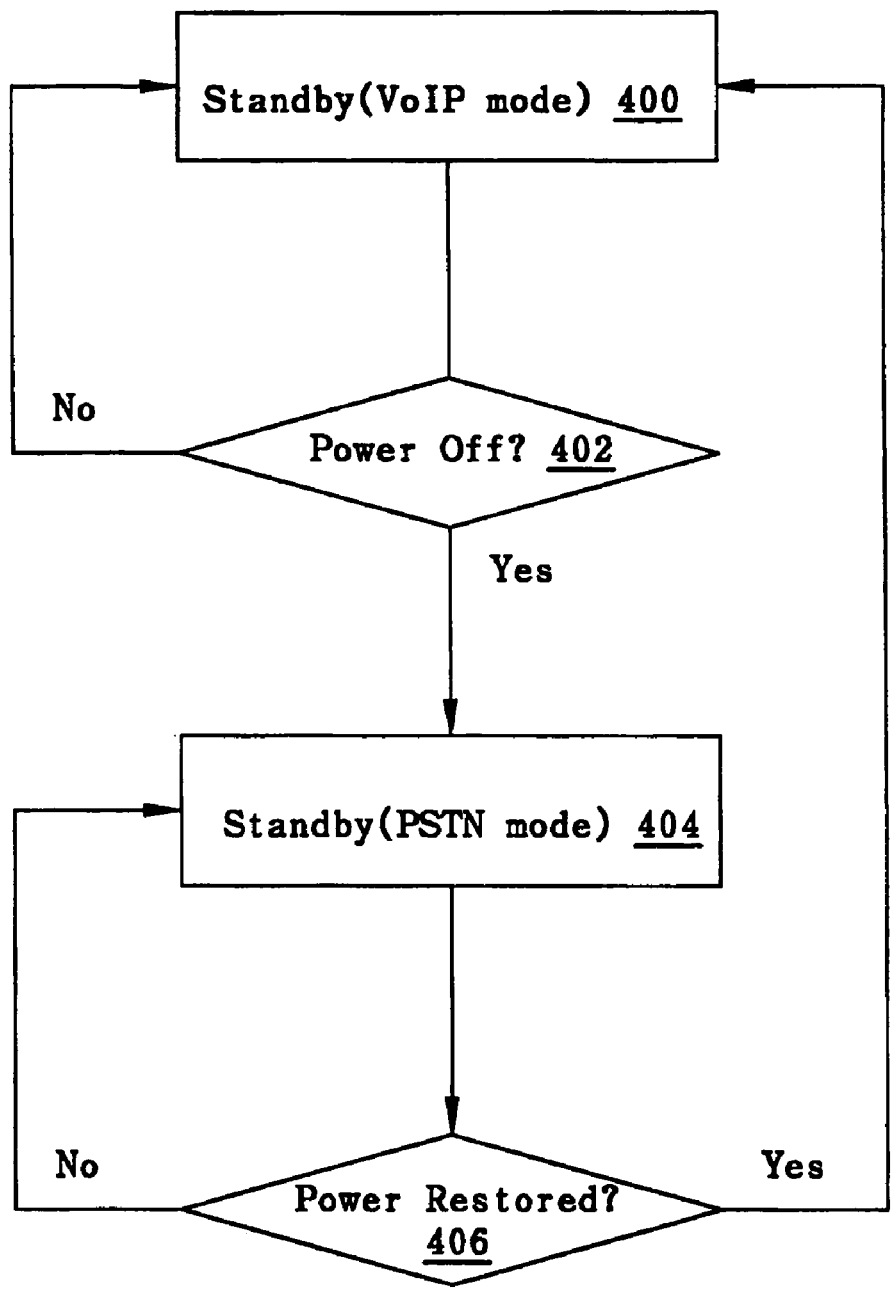
FIG. 4A illustrates the flow chart when the present VoIP terminal power off under standby state.
Figure 4B:
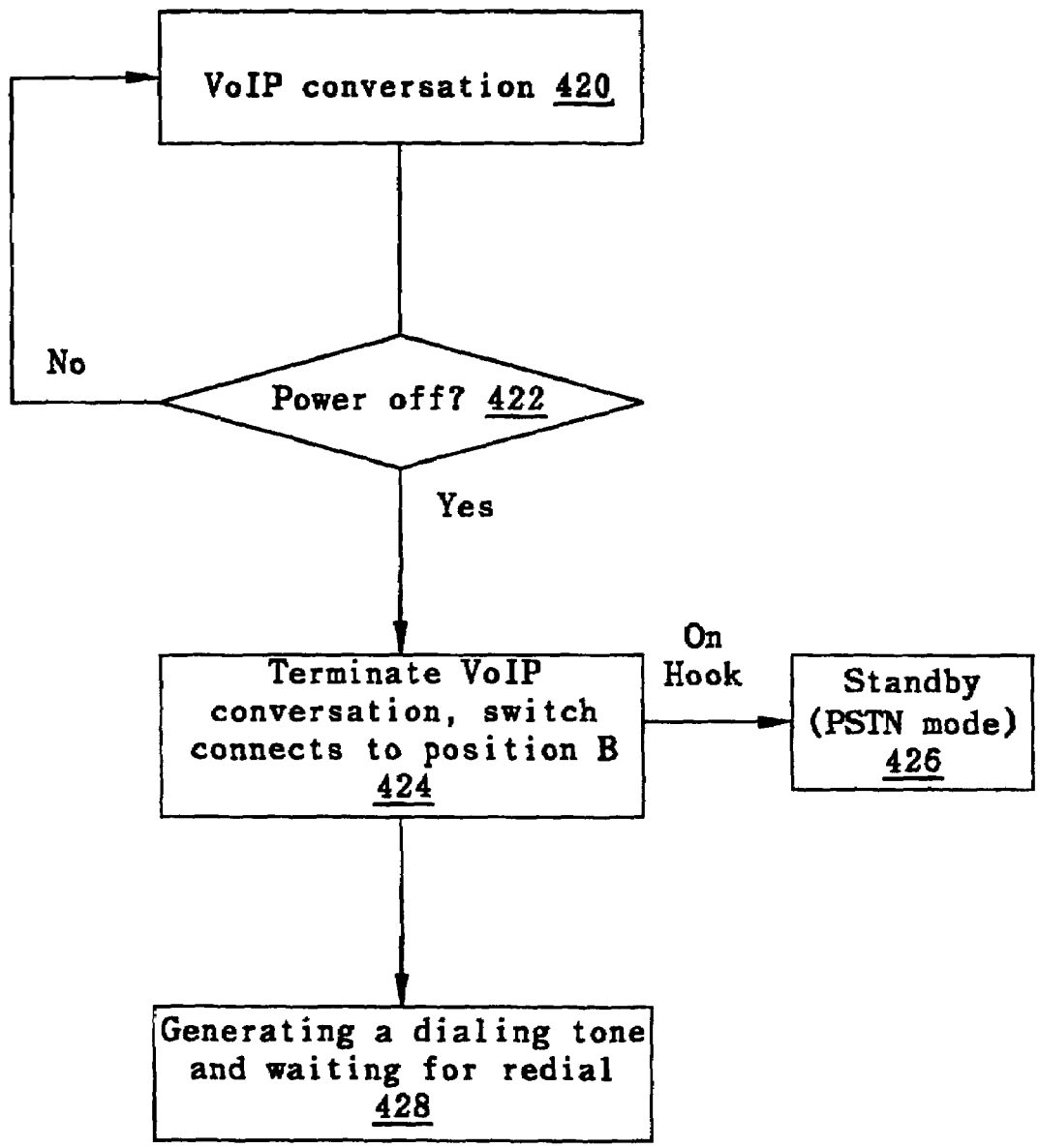
FIG. 4B illustrates the flow chart when the present VoIP terminal power off under as having a conversation.

As mentioned before, the present invention is lifeline supported, which may switch to the PSTN mode which no local power supply is needed. FIG. 4A shows the process flow when the standby VoIP terminal meets power cutoff condition. Firstly, the present VoIP terminal stands by at VoIP mode (step 400). When the VoIP terminal power is off, the switch unit 37 (shown in FIG. 3) switches to position B for connecting the FXO port 382 with FXS port 386, and VoIP terminal becomes standing by at PSTN mode (step 404). Otherwise the VoIP terminal maintains standby status in the VoIP mode. If the power supply is restored, the switch unit 37 switches back to position A and the VoIP terminal returns to VoIP mode, or else the VoIP terminal remains in PSTN mode till power supply restored. FIG. 4B shows the process flow for the present VoIP terminal meeting power off condition when having a VoIP conversation. Similar to the mentioned signal flow of the standby status, the proceeded VoIP conversation will be terminated because of power off condition, and the switch unit 37 switches to position B (step 424). Now if the handset of a local phone set behind the FXS port 386 doesn't hook on, the terminal sends a dialing tone and awaits for the inputting phone number again (step 428). If the handset hooks on, VoIP terminal changes to stand by at PSTN mode (step 426). Then next, when the power supply restores, the VoIP terminal switches back the default VoIP mode. Of course, the VoIP terminal keeps the conversation if no power off condition occurs.

Figure 5:
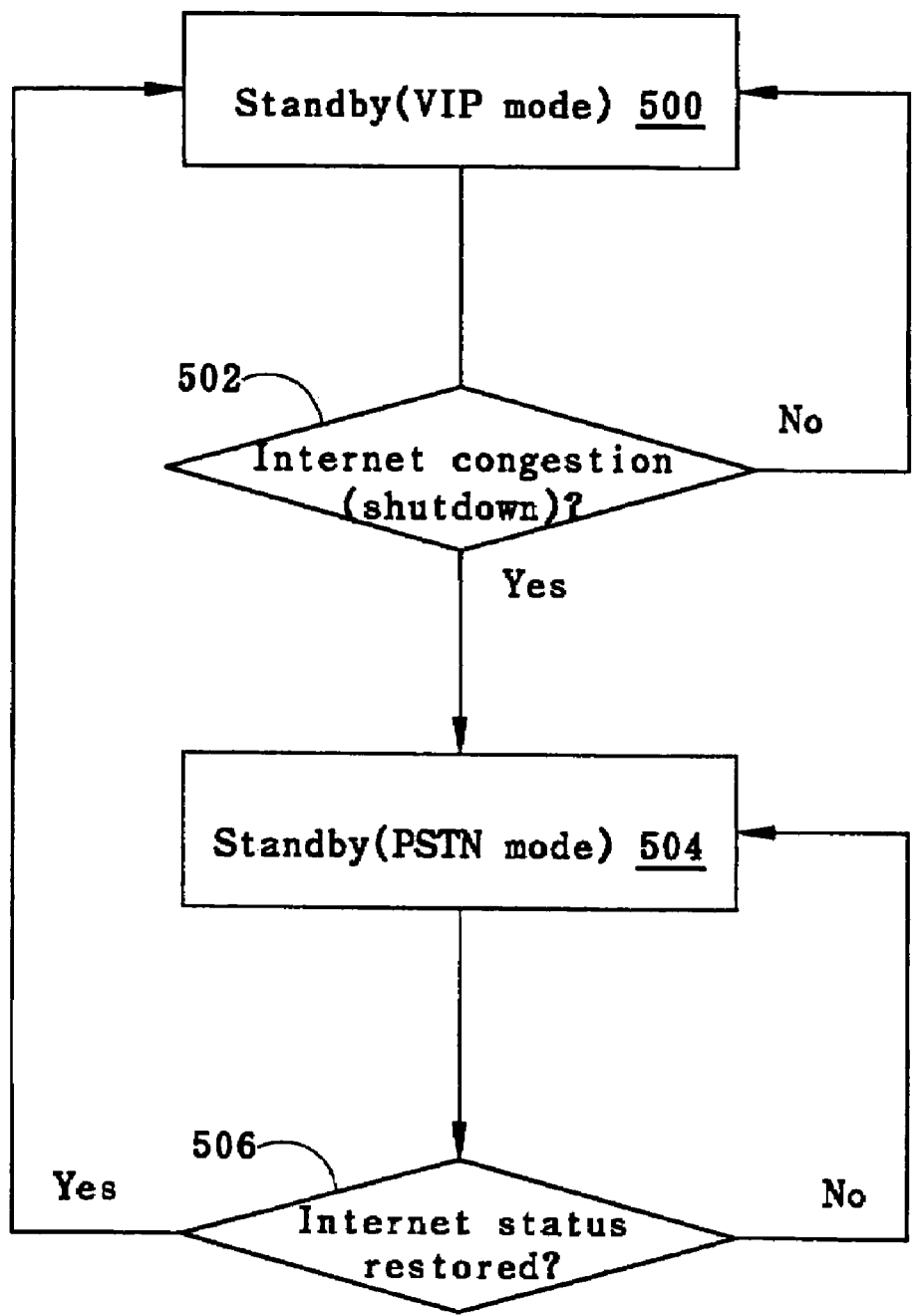
FIG. 5 illustrates the flow chart with Internet congestion or shutdown.

Foregoing operation mechanism of switching to PSTN when under power off condition is a kind of passive operation. Except in the power off condition, the present invention could further design to have the capability of switching to a PSTN mode when the Internet is congested or shutdown. This time the operation is performed by CPU 30, therefore it's an active operation. Referring to FIG. 5, when VoIP terminal at standby status (step 500), it checks Internet connection quality for every period of time (step 502). If detecting Internet congestion or shutdown, the CPU 30 controls the VoIP terminal switching to standby at PSTN mode (step 504), which makes the local phone set dialing to a foreign subscriber through the PSTN. Later, if detecting the network connection quality is restored (step 506), the VoIP terminal switches back to standby at VoIP mode, otherwise it remains PSTN mode until next time the VoIP terminal detects the Internet connection is restored.

Figure 6:
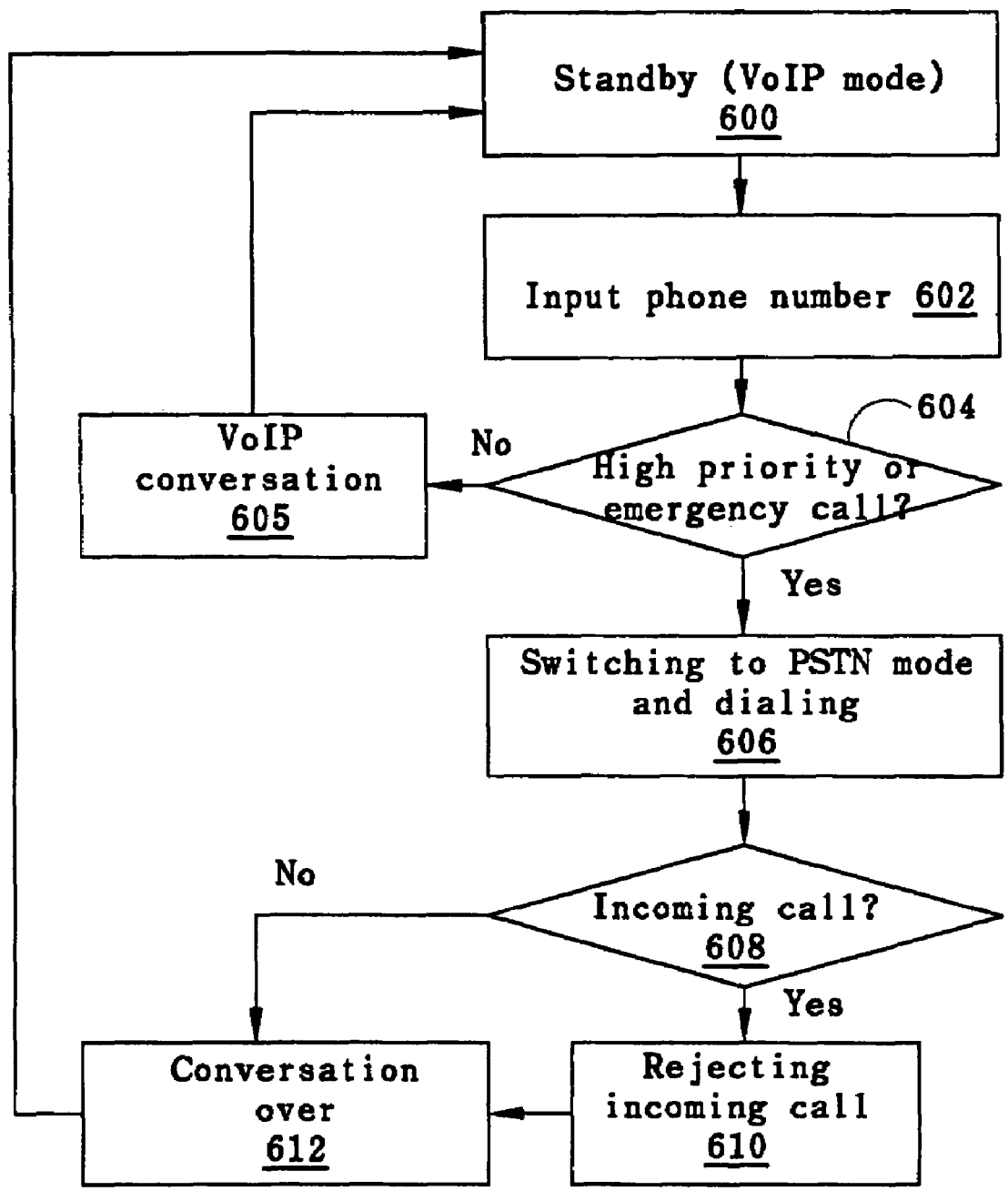
FIG. 6 illustrates the flow chart as dialing an emergency call.

Besides, the present invention also has specific process flow for ensuring the completion of high priority or emergency phone. Referring to FIG. 6, firstly the VoIP terminal standbys at default VoIP mode (step 600). Next, the local phone set inputs a phone number (step 602). As the phone number is inputted, the CPU 30 verifies if the input number is the high priority or emergency phone (step 604), such as the 911. If yes, the VoIP terminal will switch to PSTN mode and establish the connection through PSTN instead of original Internet environment (step 606), otherwise establishes VoIP conversation (step 605) and remains until the conversation is finished. Besides, as the high priority or emergency phone is proceeding, CPU 30 will reject other incoming calls no matter they came from Internet or PSTN, thereby ensuring the PSTN conversation will not be interrupted by communication problems or the incoming calls. Hence if an incoming call arrives (step 608), the VoIP terminal will reject all other incoming calls (step 610) until the conversation is over (step 612). Afterward VoIP terminal switches back to default VoIP mode automatically.

According to the foregoing descriptions, the invention provides a PSTN connection supportable VoIP terminal, by which the user may choose to dial a phone through Internet or PSTN for different communication demands of communication quality and charges. Besides, the invention further considers of the power off condition, communication problems, and the situation of having an emergency call to provide the corresponding operation mechanism, thereby making the present VoIP to obtain the best conversation quality. Therefore, it concludes that the present invention should be novel, progressive, and patentable.

The above-mentioned are only the preferred embodiments of the present invention, not intended to limit the scope thereof. It will be appreciated and carried out by those professions skilled in the art. Thus, many modifications of the embodiments that can be made without departing from the spirit of the present invention should be covered by the following claims.

What is claimed is:

1. A VoIP terminal comprising:
   a CPU for controlling of the communication path of a voice signal under a power on condition, comprising:
      a verify means for verifying whether an input number is an emergency call or a pre-defined high priority call, and performing public switch telephony network (PSTN) conversation when said input number is an emergency call or a pre-defined high priority call;
   an Internet communication module for the transformation between a digital voice and an Internet packet;
   a data process module for the conversion between an analog voice and said digital voice;
   a set of communication ports comprising:
      a network port for connecting to a network environment and further connecting to Internet;
      a first port for connecting to a PSTN; and
      a second port for connecting to a voice input/output device; and
   a switch unit between said process unit and said sets of communication ports for selectively connecting said first port or said data process module with said second port.

2. The VoIP terminal of claim 1, wherein said data process module further comprises an encryption/decryption circuits for encrypting/decrypting said voice signal.

3. The VoIP terminal of claim 1, wherein said network environment comprises Ethernet LAN.

4. The VoIP terminal of claim 1, wherein said switch unit is an active switch.

5. The VoIP terminal of claim 4, wherein said active switch comprises the capabilities of:
   connecting said second port with said data process module under the power on condition;
   connecting said second port with said first port for establishing PSTN conversation as receiving a control signal of the process unit; and
   automatically connecting said second port with said first port under a power off condition.

6. The VoIP terminal of claim 1, wherein said switch unit is a passive switch.

7. The VoIP terminal of claim 6, wherein said passive switch connects said second port with said data process module, and automatically connects said second port with said first port under a power off condition.

8. The VoIP terminal of claim 6, wherein said passive switch is a relay.

9. The VoIP terminal of claim 1 further comprising a keyboard for inputting a set of phone numbers, a speaker and a microphone for outputting/inputting a voice.

10. The VoIP terminal of claim 1 further checking an Internet connection quality for selectively performing VoIP or PSTN conversation.

11. The VoIP terminal of claim 1 further comprising a memory module for storing a set of phone numbers and a plurality of temporary data.

* * * * *